May 19, 1942.                A. SIMONS                    2,283,393
REELING OR SPOOLING DEVICE AND METHOD OF REELING WIRE AND OTHER MATERIALS
                Filed July 10, 1941         2 Sheets-Sheet 1

INVENTOR.
Abraham Simons
BY
Mock & Blum
ATTORNEYS

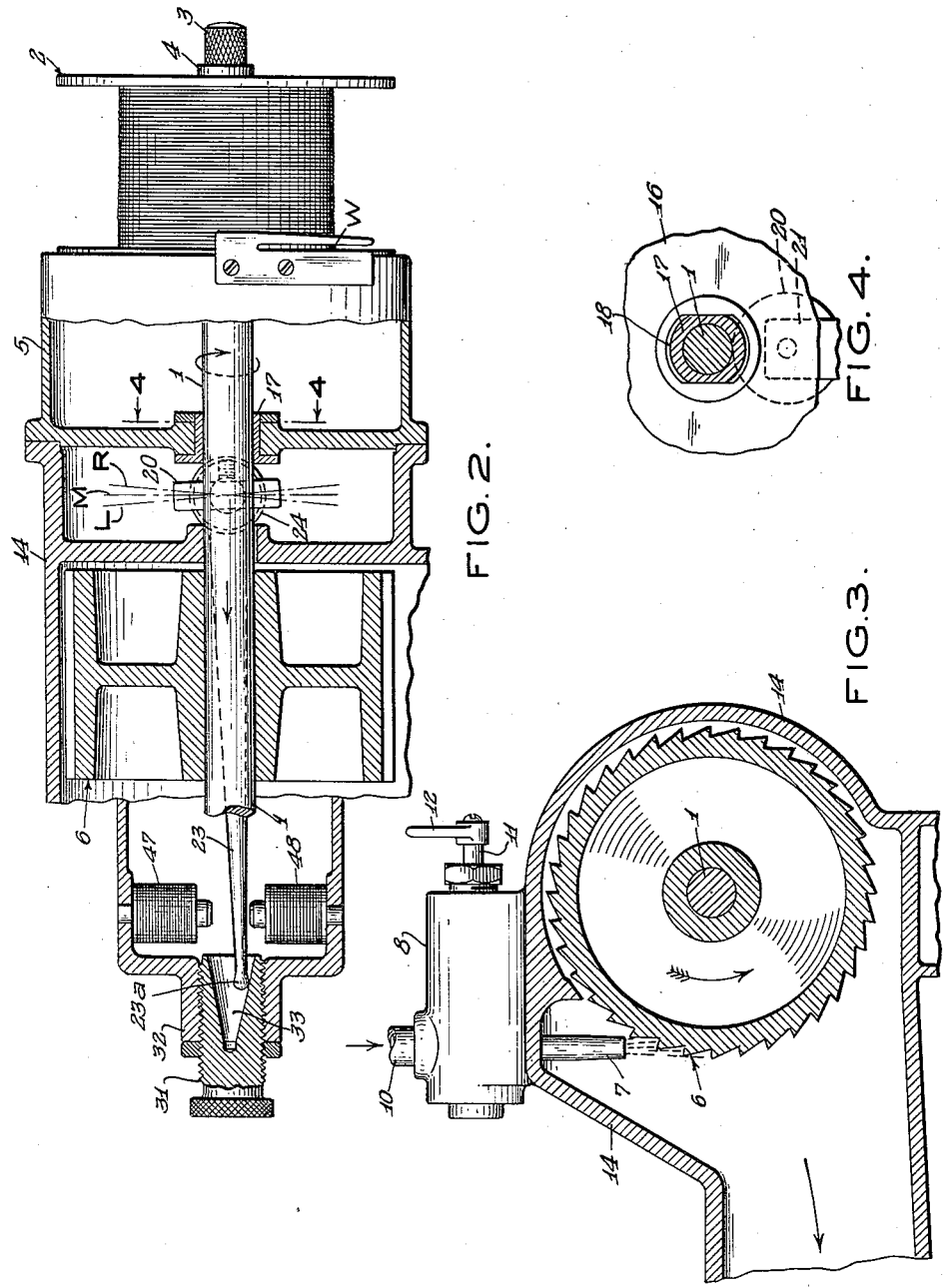

Patented May 19, 1942

2,283,393

UNITED STATES PATENT OFFICE 2,283,393

REELING OR SPOOLING DEVICE AND METHOD OF REELING WIRE AND OTHER MATERIALS

Abraham Simons, New York, N. Y., assignor to Hydrawmatic Machine Corporation, New York, N. Y., a corporation of New York Application July 10, 1941, Serial No. 401,720

9 Claims. (Cl. 242—25)

My invention relates to a new and improved reeling or spooling device, and to a new and improved method of reeling wire and other materials, in the form of a plurality of superposed helical layers.

One of the objects of my invention is to provide a machine which has a reel or spool and which has improved means for automatically turning the spool or reel around its own axis, and for simultaneously moving the reel or spool back and forth in the direction of its axis, in order to wind upon said reel or spool a series of helically wound layers of material, such as wire or any other material.

Another object of the invention is to provide a machine of this kind which has a turbine drive for rotating the shaft of the spool or reel, and auxiliary automatic means for reciprocating the shaft in the direction of its axis. Said auxiliary control means may be of any type, and while I have illustrated electrical auxiliary control means, this is merely for the purpose of illustration, and the invention is not limited thereto.

Another object of the invention is to provide simple and efficient means for regulating the relation between the rotating movement of the spool or reel and its reciprocating movement, in order to regulate the pitch of the winding of the material on the spool or reel, so that the machine can be easily adjusted for materials of different diameters or widths.

Another object of the invention is to secure the reciprocating movement of the reel by means of a roll which contacts frictionally with the shaft of the reel, the angle between the periphery of said roll and the periphery of said shaft being automatically reversed.

Another object of the invention is to provide a friction drive between the shaft and the roll, by causing the roll to support the weight of the turbine and shaft and reel.

Other objects of the invention will be stated in the annexed description and drawings which illustrate a preferred embodiment thereof, it being understood that the above general statement of the objects of my invention is not intended to limit the same.

Fig. 2 is a sectional view, partially in elevation, on the line 2—2 of Fig. 1.

Figure 1:
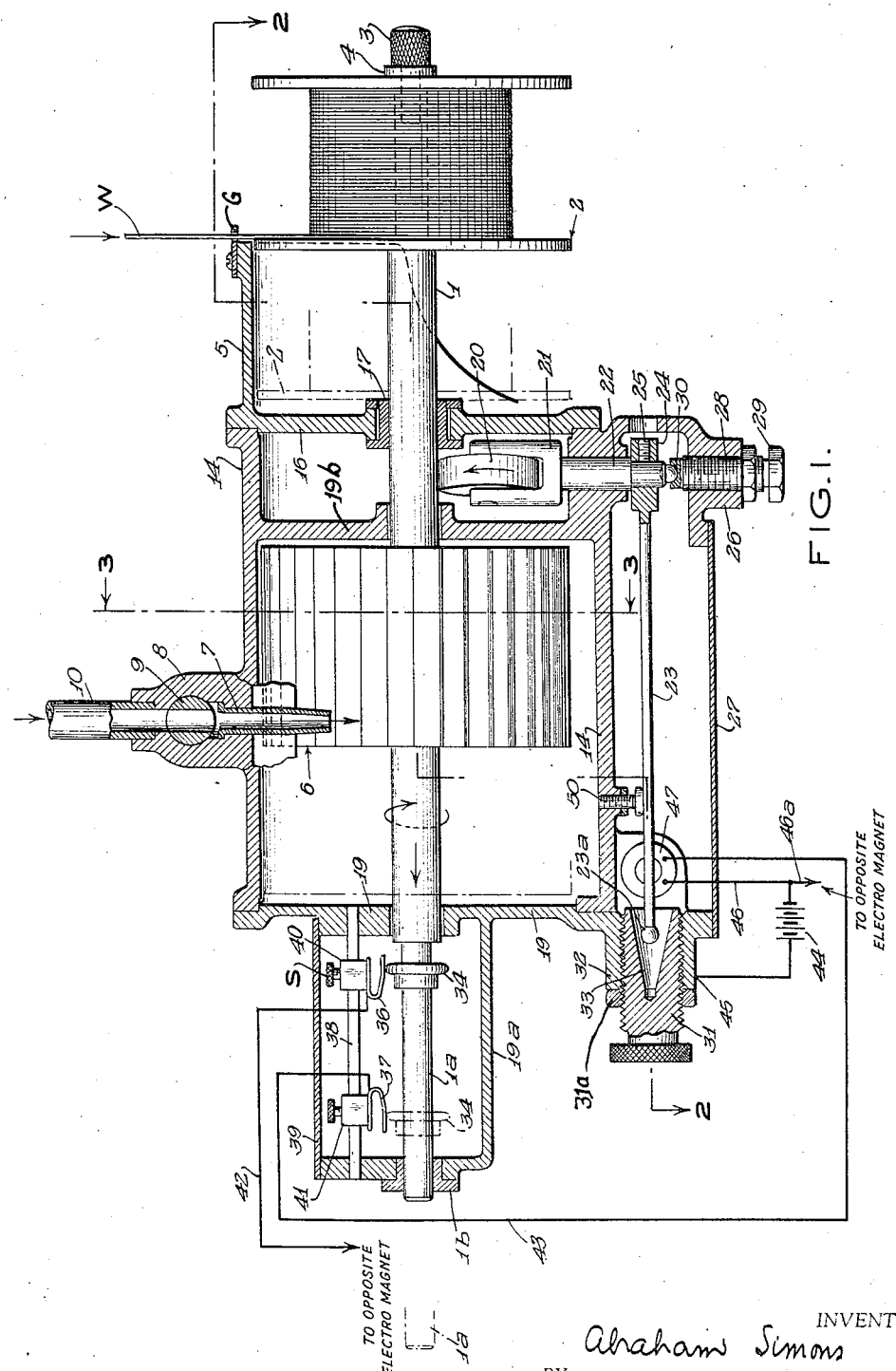
Fig. 1 is a vertical cross-section, partially in elevation, of the improved machine.

Figs. 3 and 4 are respectively sectional views on the lines 3—3 of Fig. 1 and 4—4 of Fig. 2.

The machine comprises a shaft 1 upon which the spool or reel 2 is fixed by any suitable means, such as a screw which has a head 3, and a washer 4. The shank of said screw is held in a tapped opening in the respective end-wall of the respective reduced extension of the shaft 1, so as to clamp the spool or reel 2 against the respective shoulder of the shaft 1.

The shaft 1 extends through a supplemental housing 5, which is suitably fixed to the main housing 14. The housing 5 has a vertical wall or flange 16, in which the bearing 17 of the shaft 1 is located. As shown in Fig. 4, this bearing 17 is slidable up and down in an elongated slot 18 of the wall or flange 16. The bearing 17 is provided with suitable detachable heads or flanges which prevent the bearing 17 from moving laterally relative to the flange 16, and any suitable means may be provided for this purpose.

As shown in Fig. 4, the bearing 17 has vertical planar walls which slide against corresponding vertical planar walls of the slot 18, so that the bearing 17 cannot turn in the slot 18, and the only movement of the bearing 17, relative to the wall or flange 16, is a vertical up and down movement. The top and bottom walls of the bearing 17 are parts of cylindrical surfaces, and the top and bottom walls of the slot 18 have correspondingly shaped walls, which limit the vertical up and down movement of bearing 17. The portion of the shaft 1 which is directly adjacent the bearing 17, rests upon a roll 20, which is of cylindrical shape and which is turnably mounted in a yoke 21. The yoke 21 has a shank or an extension 22 which projects through a bore of the housing 14. The housing 14 is provided with a sleeve-projection 26, which has a tapped bore, in which the shank 28 of an adjusting screw is adjustably fixed. This adjusting screw has a head 29. The inner end of the adjusting screw 28 has a recess of partial spherical shape in which a ball 30 is turnably retained in any suitable manner. This ball 30 also extends into a partial spherical recess at the bottom end of the shank 22. Hence, the screw 28 can be adjusted so as to raise the shank 22 until the full weight of the shaft 1 and of its reel 2 is substantially or wholly supported upon the roll 20, thus producing an efficient friction drive between the shaft 1 and the roll 20. The shaft 1 and the roll 20 are made of hardened steel or other suitable metal or alloy. The shank 22 can turn freely around its vertical axis, relative to shank 28 of the adjusting screw, since the ball 30 provides an anti-friction support for said shank 22.

A rotor or turbine 6 is suitably fixed to the shaft 1. This rotor 6 is driven by means of a jet of liquid or air or any suitable gas, which is forced at the desired velocity through a nozzle 7. The nozzle 7 is located in an extension 8 of the housing 14, and said extension has the usual valve 9 which is provided with a shaft 11, which has the control handle 12. The liquid or air or gas is supplied through the pipe 10 and the conventional valve 9 can open or close communication between the pipe 10 and the nozzle 11. Fig. 3 shows that the housing 14 is provided with any conventional outlet for the actuating liquid or air or gas.

The end of the shaft 1 which is remote from the reel 2 is located, with slight clearance, in a bore of the wall 19, which is detachably fixed to the housing 14 in any suitable manner. This wall 19 has a housing 19a integral therewith. The shaft 1 has a reduced extension 1a which is located in said housing 19a, which is provided with a removable cover 39.

A rod 38 is fixed in the vertical walls of the housing 19a. Blocks 40 and 41 are respectively made of fiber or other suitable insulating material, and they are adjustably fixed to the rod 38 by means of suitable clamping screws S. The respective blocks 40 and 41 respectively support resilient contact blades 36 and 37. The metal collar 34 is fixed to the shaft 1, and as the shaft 1 is moved longitudinally back and forth in the direction of its axis, the collar 34 is moved between the full-line position and the broken-line position which are shown in Fig. 1, in unison with the shaft 1. In the full-line position of the metal collar 34, it contacts with the blade 36, and in the broken-line position of the collar 34, it contacts with the blade 37. The end of the extension 1a projects through a bearing 1b which is suitably fixed to the respective vertical wall of the housing 19a.

Fig. 1 is drawn to one-third the scale of an actual working embodiment, so that reference may be made thereto for further details. The extension 1a may have a slight loose fit in the bearing 1b.

A lever 23 has a hub 24 which is fixed to the shank 22, by means of a clamping screw 25. The lever 23 and the shank 22 can therefore be turned back and forth in unison, around a vertical axis, so that the lever 23 turns back and forth in a horizontal plane.

The lever 23 has a ball-shaped end 23a which is located in the recess 33 of a threaded bushing 31, which is screwed into the tapped bore of an extension 32 of the wall 19. A screw 50, which is made of mild steel or other material which is permeable to magnetic flux, is adjustably fixed in a tapped bore of the housing 14. The head of said screw 50 makes light frictional contact with the lever 23. The screw 50 provides a closed path for the magnetic flux, which will be later more fully described. There may be a small air-gap between the head of screw 50 and lever 23. The lever 23 and the electro-magnets 47 and 48 are located in a compartment which is closed by a detachable cover 27.

In Fig. 1, the reference numeral 44 indicates any suitable source of direct current. This direct current may be derived from a battery or a direct current dynamo or it may be a rectified alternating current. Likewise, I can use an alternating current by employing that type of electro-magnet which produces a magnetic flux of fixed direction, even though said electro-magnet is energized by an alternating current.

The source of electric current 44 has one terminal thereof grounded at 45, by connection to the grounded metal frame of the machine. The other terminal of the source 44 has a wire 46 which is connected to one end of the coil of the electro-magnet 47, and it also has a wire 46a which is connected to one end of the coil of the electro-magnet 48. The respective other ends of the coils of the electro-magnets 47 and 48 are respectively connected to the respective contact springs 37 and 36. Said other end of the coil of the electro-magnet 47 is connected by the wire 43 to the contact spring 37, and said other end of the coil of the electro-magnet 48 is connected by the wire 42 to the contact spring 36. Hence, only the electro-magnet 48 is energized when the collar 34 is in the full-line position shown in Fig. 1, and said electro-magnet 48 is de-energized and the electro-magnet 47 is energized, when the collar 34 is in the broken-line position shown in Fig. 1, in which position said collar 34 contacts with the spring 37. Hence the electro-magnets 47 and 48 are alternately energized, one of said electro-magnets being de-energized when the other is energized.

When the collar 34 is in its full line position, it grounds one end of the coil of electro-magnet 48, through spring 36 and wire 42. The other end of the coil of electro-magnet 48 is connected to one terminal of the source of current 44, whose other terminal is grounded. The circuit of the coil of electro-magnet 47 is then open, because one end of said coil is then connected to spring 37, which is not grounded. The energized electro-magnet 48 then moves lever 23 to the position shown in Fig. 2. While the shaft 1 and its reel 2 are moving longitudinally to the right, and hence while collar 34 is moving from the broken-line position of Fig. 1 to the full-line position of Fig. 1, the roll 20 is in the "R" position. When collar 34 reaches said full-line position, the electro-magnet 48 is energized, while electro-magnet 47 remains unenergized. Hence, as soon as shaft 1 and reel 2 have reached the end of their predetermined longitudinal movement to the right, the lever 23 is actuated to shift roll 20 from the "R" position to the "L" position.

When the collar 34 is intermediate and spaced from the contact springs 36 and 37, both electro-magnets 47 and 48 have the circuits of their respective coils open.

Fig. 1 shows in broken lines the position of the reel 2, and the position of the end of the member 1a, when the collar 34 is in the broken-line position which is illustrated in Fig. 1.

After the friction drive between the shaft 1 and the roll 20 has been established, the wire W or other material is given a few initial turns around the body of the reel 2, enough to establish frictional contact. Power is then supplied to the turbine 6.

In Fig. 2, the plane which is perpendicular to the axis of the shaft 1 is represented by the line M. The lines L and R represent respective different positions of the central plane of the roll 20, said central plane of the roll 20 being perpendicular to its axis of rotation. When the said central plane of the roll 20 coincides with the line L, the roll 20 will exert a longitudinal thrust which will move the shaft 1 and its reel 2 and its turbine 6, longitudinally from the full-line position of the reel 2 which is represented in Fig. 1, to the broken-line position. When said central plane of the roll 20 is in the position indicated by the line R, the roll 20 will exert a frictional thrust on the shaft 1, which will move the shaft 1 and its reel 2 and its turbine 6 reversely, or to the right. When the collar 34 is in the full-line position shown in Fig. 1, the shaft 1 and its reel 2 have completed their movement to the right, and the angle of roll 20 relative to shaft 1 must be reversed, so that said central plane of the roll 20 is turned from the position R to the position L. Fig. 2 shows the respective positions of the lever 23 and the roll 20, after the reel 2 has completed its movement to the right, and after the electro-magnet 48 has been energized to reverse the angle of roll 20, so that its friction drive is ready to thrust the shaft and the reel from the full-line position of said reel to its broken-line position. This angle of the reference plane of the roll 20 to the axis of shaft 1 is very slight, so that the angles of the lines L and R relative to the line M, are much exaggerated in Fig. 2. In the position of the roll 20 which is shown in Fig. 2, its central reference plane coincides with the line L.

The operation of the device is as follows:

In starting the machine, the reel 2 is preferably in the full-line position which is shown in Fig. 1. The operator raises the roll 20 until it abuts the shaft 1, and until the bearing 17 is spaced from the bottom wall of slot 18. The top wall of bearing 17 may then abut or be spaced from the top wall of slot 18. The shaft 1 and the parts which are located on said shaft, are then supported by bearing 1b and by the roll 20. The axis of shaft 1 is then very slightly inclined to a horizontal line, said inclination being upward from bearing 1b. The bores or bearings of walls 19 and 19b, through which the shaft 1 passes, have enough clearance to permit this inclination. The shaft 1 also has sufficient clearance in bearing 1b, to permit this inclination of the shaft 1. The bearing 1b may be adjustably connected to the housing 19b in any conventional manner, so that it can be tilted in unison with the tilting of the shaft 1, which is required for said inclination. The rotor 6 and the reel 2 are located close to the roll 20, so that the common centre of gravity of the shaft 1 and of the rotor 6 and of the reel 2, is located directly above or close to the cylindrical periphery of the roll 20.

The operator then closes the circuit of the source 44, by a conventional hand-switch, which is not shown. Since the contact collar 34 now touches the contact spring 36, the circuit of the electro-magnet 48 is closed, while the electro-magnet 47 remains de-energized. The lever 23 acts as an armature for the respective electro-magnets. When electro-magnet 48 is thus energized, the lever 23 is turned to the position shown in Fig. 2, in which the line L is in the reference plane of roll 20. The ball-shaped end 23a of lever 23, then contacts with the inner smooth and frusto-conical wall of the bushing 31.

There is then a small air-gap between the lever 23 and the core of the electro-magnet 48. One end of said core fits snugly in a recess of the extension of the wall of the housing 14. It is sufficient if said core abuts said extension. The flux thus has an all-metal path of high permeability which includes the wall of the bushing 23 and the screw 50 and the wall of housing 14, when lever 23 is in the position shown in Fig. 2 or in the reverse position.

The operator now opens the valve 9, thus admitting water or other fluid, into the nozzle 6. The friction drive of the roll 20 by the shaft 1 now produces a thrust to the left, so that the reel is moved horizontally and longitudinally to the left, in addition to being rotated around its own axis. The force of this longitudinal thrust, and the speed of said longitudinal movement, is regulated by regulating the angle between the lines L and M. This can be done by longitudinally adjusting the adjustable bushing 31. For example, if the bushing 31 is shifted to the right of the position which is shown in Fig. 2, the angle between the lines L and M is decreased. The speed and the length of the longitudinal movement of the reel 2 are thus adjusted with reference to the diameter of width of the material W, which may be cylindrical wire, or metal strip, or any material. The electro-magnet 48 thus remains energized until the collar 34 moves out of contact with the spring 36. Both of the electro-magnets 47 and 48 are now de-energized. However, the friction of shank 22 in its bearing is sufficient to retain lever 23 in the position to which it has been biased by the electro-magnet 48. Any suitable friction means may be provided to retain the shank 22 in its biased position. When the reel is in the broken-line position shown in Fig. 1, the collar 34 contacts with spring 36 and the electro-magnet 47 is energized to move the lever 23 to a position which is the reverse of that shown in Fig. 2. The roll 20 is thus turned around the vertical axis of shank 22 until the line R is in the reference plane of said roll.

The bushing 31 is held in its adjusted position by means of a lock washer 31a. Since the blades of the rotor 6 are horizontal, the torque of the rotor is not affected by the longitudinal movement of the rotor, so that the reel 2 is rotated at uniform speed. The wire is led to the reel through the eye or slot of a guide G.

The bearing 17 provides a stop for limiting the left-hand movement of the reel 2. Any suitable stop may be provided for limiting the right-hand movement of the reel 2, so that it cannot move to the right of the full-line position which is shown in Fig. 1.

I have shown a preferred embodiment of my invention, but it is clear that numerous changes and omissions can be made without departing from its spirit.

The vertical axis of the shank 22 intersects the central point of the horizontal axis of roll 20, and it also intersects the substantially horizontal axis of shaft 1. When the reference plane of roll 20 coincides with line M, the top straight linear element of roll 20 contacts with the bottom straight linear element of shaft 1. Said respective linear elements are parallel to the parallel axes of shaft 1 and of roll 20, since the axis of roll 20 is parallel to the axis of shaft 1, in the "M" position of roll 20. Since the shaft 1 and roll 20 are made of hard metal, their deformation is very slight under the weight of shaft 1 and of the parts mounted thereon.

When the roll 20 is turned around the vertical axis of shank 20 to the position L, there would be theoretically only point contact between the cylindrical peripheries of shaft 1 and roll 20, if said shaft and roll were made of incompressible material, and this theoretical point of contact would be located on the vertical axis of shank 22. In actual practice, the peripheries of shaft 1 and of roll 20 are slightly flattened at their zone of contact. Since the shaft 1 is supported at 1b and on the roll 20, this flattened zone, or a major part thereof, is located at the left of this theoretical point of contact.

The shaft 1 exerts a driving torque upon the driven idler roll 20, which is driven solely by the shaft 1. This driving torque is in the direction of the line M. It has a driving component in the direction of the line L and another component which is perpendicular to the line M. The roll 20 is thus urged horizontally to the right, and the shaft 1 is urged horizontally to the left, when roll 20 is in the "L" position. Roll 20 cannot move to the right, because shank 22 fits turnably but closely in its bearing in the wall of housing 14.

Both electro-magnets are identical and they operate in the same manner to successively reverse the lever 23. If the shank 22 fits with some friction in its bearing, the force of each electro-magnet is sufficient to overcome said friction. The roll 20 may have a friction facing of leather, rubber, or other compressible material, if desired, and the abutting part of shaft 20 may have a corresponding friction facing. In actual practice, such friction facing has been found unnecessary.

The weight of turbine 6 may exceed the weight of the fully loaded reel, so that the centre of gravity of the shaft 1 and its turbine 6 and reel 2 does not substantially shift as the reel is loaded.

In actual practice, the reel is turned at the rate of 100–600 revolutions per minute. The longitudinal movement of the shaft is therefore very slow, about one inch per minute, if fine wire is being wound. Hence, the longitudinal momentum of the shaft and rotor and reel is very small, and it may be disregarded. The cores of the electro-magnets 47 and 48 may have sufficient residual magnetism to retain the lever 23 in each of the respective biased positions which correspond to the lines L and R. Hence, the lever 23 is retained in its respective biased position by said residual magnetism, even when both of the coils of said electro-magnets have open circuits.

I claim:

1. A method of winding material on a reel, which consists in rotating said reel around a predetermined axis by a driving force, and moving said reel to-and-fro in the direction of said axis by respective components of said driving force which are oppositely inclined relative to said axis.

2. A method of winding material on a reel, which consists in rotating said reel around a predetermined axis by a driving force, and moving said reel to-and-fro in the direction of said axis by respective components of said driving force which are oppositely inclined relative to said axis, said driving force being a substantially uniform torque which is exerted by a moving body of fluid.

3. A reeling machine, comprising a reel which is mounted on a shaft, drive means adapted to turn said shaft around its axis, said shaft being movable to-and-fro in the direction of its axis, a roll which is frictionally coupled to said shaft, said roll having an axis of rotation, control means adapted to turn said roll successively to respective positions in which a plane which is perpendicular to the axis of rotation of the roll makes respective opposite angles with the axis of the shaft.

4. A device according to claim 3, including adjustable means to control the value of said opposite angles.

5. A device according to claim 3, in which said drive means are a fluid actuated rotor and means for supplying a propelling body of liquid to said rotor.

6. A reeling machine comprising a reel which is mounted on a shaft, said shaft having a fluid-actuated rotor fixed thereto, said shaft being movable to-and-fro in the direction of its axis, a roll frictionally coupled to said shaft, said roll being turnable about its own axis which is spaced from the axis of the shaft, said roll being turnably connected to a mount, said mount being turnable around an axis which is non-parallel to the axis of the shaft and the axis of the roll, said mount being turnable around the third-mentioned axis to respective positions in which a plane which is perpendicular to the axis of the roll makes respective equal and opposite angles to the axis of the shaft, two electro-magnets, a lever connected to said mount and located between said electro-magnets, each magnet moving said lever to a position in which said mount is in one of said respective positions when the respective electro-magnet is energized, a stop for limiting the movement of said lever under the respective forces of said electro-magnets, the circuit of the coil of each electro-magnet including a contact member which is a first terminal of said circuit, insulating mounts for said first terminals, said mounts being spaced longitudinally from each other in the direction of the axis of the shaft, the other terminal of each said circuit being a common contact member which is mounted on said shaft, the longitudinal distance between said first-mentioned contact members exceeding the width of said common contact member, each electro-magnet operating said lever to actuate said roll to a position in which it urges the shaft in a longitudinal movement which is reverse to the longitudinal movement in which said common contact member is moved into contact with the respective first terminal.

7. A machine according to claim 6 in which the roll is located under the shaft and it supports sufficient of the weight of the shaft and of the parts thereon to frictionally couple the shaft and the roll.

8. A device according to claim 6 in which the stop is adjustable to limit the movement of said lever.

9. A device according to claim 6 in which the machine has a frame which is permeable to magnetic flux, a member which conducts magnetic flux, said member being connected to said frame and having a free end which substantially abuts the lever in each position of said lever.

ABRAHAM SIMONS.